(12) United States Patent
Suzuki et al.

(10) Patent No.: US 10,725,717 B2
(45) Date of Patent: Jul. 28, 2020

(54) PRINTING APPARATUS, CONTROL METHOD FOR PRINTING APPARATUS, AND PRINTING SYSTEM WHICH CONTROLS IMAGE ROTATION BASED ON PRINTING MEDIUM

(71) Applicant: CANON KABUSHIKI KAISHA, Tokyo (JP)

(72) Inventors: Takeshi Suzuki, Inagi (JP); Arata Miyagi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/366,859

(22) Filed: Mar. 27, 2019

(65) Prior Publication Data
US 2019/0303077 A1 Oct. 3, 2019

(30) Foreign Application Priority Data

Mar. 30, 2018 (JP) .................................. 2018-068249

(51) Int. Cl.
*G06F 3/12* (2006.01)
(52) U.S. Cl.
CPC .......... *G06F 3/1254* (2013.01); *G06F 3/1204* (2013.01); *G06F 3/1205* (2013.01); *G06F 3/1285* (2013.01)

(58) Field of Classification Search
None
See application file for complete search history.

(56) References Cited

U.S. PATENT DOCUMENTS

| 10,025,542 B2 * | 7/2018 | Inui ........................ G06F 3/1285 |
| 2005/0100358 A1 * | 5/2005 | Ushio .................... G03G 15/36 399/82 |
| 2014/0078539 A1 * | 3/2014 | Kakitsuba ............. G06F 3/1204 358/1.13 |

FOREIGN PATENT DOCUMENTS

| JP | 2006-164106 A | 6/2006 |
| JP | 2015011506 A * | 1/2015 |

* cited by examiner

*Primary Examiner* — Thomas D Lee
(74) *Attorney, Agent, or Firm* — Canon U.S.A., Inc. I.P. Division

(57) ABSTRACT

In a case where double-sided printing is set and a predetermined binding direction is set as a print setting for printing on a predetermined type of medium, a printing apparatus performs second rotation processing on an image targeted for printing transmitted from a terminal apparatus such that an orientation of the image targeted for printing returns to an orientation of the image obtained before first rotation processing is performed on the image by the terminal apparatus, and then performs single-sided printing of the image targeted for printing.

19 Claims, 6 Drawing Sheets

PRINTING APPARATUS, CONTROL METHOD FOR PRINTING APPARATUS, AND PRINTING SYSTEM WHICH CONTROLS IMAGE ROTATION BASED ON PRINTING MEDIUM

BACKGROUND OF THE INVENTION

Field of the Invention

Aspects of the present disclosure generally relate to a printing apparatus, a control method for a printing apparatus, and a printing system, each of which is configured to perform printing of an image targeted for printing received from a terminal apparatus.

Description of the Related Art

Printing apparatuses for printing an image on a sheet of printing paper (print sheet) include a printing apparatus having an automatic double-sided printing (2-sided or duplex printing) mechanism, which first performs printing on one side of a print sheet, then automatically reverses the print sheet, and performs printing on the reverse side of the print sheet. Japanese Patent Application Laid-Open No. 2006-164106 discusses a printer driver designating automatic double-sided printing as one of the print settings.

Moreover, print medium for postcards include sheets adapted for printing a photograph on a communication side thereof, which is the reverse side of the address side, such as "inkjet postcards" and "gloss photo postcards". In these postcards, while the material of the surface of the address side is paper, the communication side is further provided with an ink receptive layer, so that the image quality of a photograph printed on the communication side is improved. Accordingly, image processing is required to differ between the address side and the communication side. Thus, with regard to postcards on the communication side of which a photograph is printed, setting of double-sided printing for printing on postcards, which is performed via a printer driver, may be restricted in such a manner that printing is individually performed on the address side and the communication side not by automatic double-sided printing but by single-sided printing (1-sided printing or simplex printing).

Furthermore, there is a printing system included in an operating system (OS) as standard equipment, which utilizes a communication protocol that enables printing without using a printer driver for printing apparatuses. Such a communication protocol includes, for example, the Internet Printing Protocol (IPP) and the Web Services on Devices (WSD). In such a printing system, since a printer driver is not used, the setting of double-sided printing for printing on postcards may not be properly restricted. Therefore, a print job for printing on postcards in which "double-sided printing" is set as the print setting may be transmitted from a terminal apparatus to a printing apparatus.

SUMMARY OF THE INVENTION

Aspects of the present disclosure are generally directed to providing a technique capable of performing appropriate printing on a medium unadaptable to automatic double-sided printing.

According to an aspect of the present disclosure, a printing apparatus that performs printing of an image received from a terminal apparatus includes an acquisition unit configured to acquire print settings for printing of the image, a rotation unit configured to perform rotation processing on the image in a case where double-sided printing is set and a predetermined binding direction is set as print settings for printing on a predetermined type of medium based on the print settings acquired by the acquisition unit, and a printing unit configured to perform single-sided printing of the image rotated by the rotation unit, wherein the terminal apparatus performs first rotation processing on the image in a case where double-sided printing is set and the predetermined binding direction is set as print settings for printing on the predetermined type of medium, and transmits the image on which the first rotation processing has been performed to the printing apparatus, and wherein the rotation unit performs second rotation processing on the image such that an orientation of the image transmitted from the terminal apparatus returns to an orientation of the image obtained before the first rotation processing is performed on the image.

Further features of the present disclosure will become apparent from the following description of exemplary embodiments with reference to the attached drawings.

DESCRIPTION OF THE EMBODIMENTS

Various exemplary embodiments, features, and aspects of the disclosure will be described in detail below with reference to the drawings. However, for example, the relative locations of constituent elements and display screens described in the following exemplary embodiments are not intended to limit the respective exemplary embodiments to only the described ones.

Figure 1:
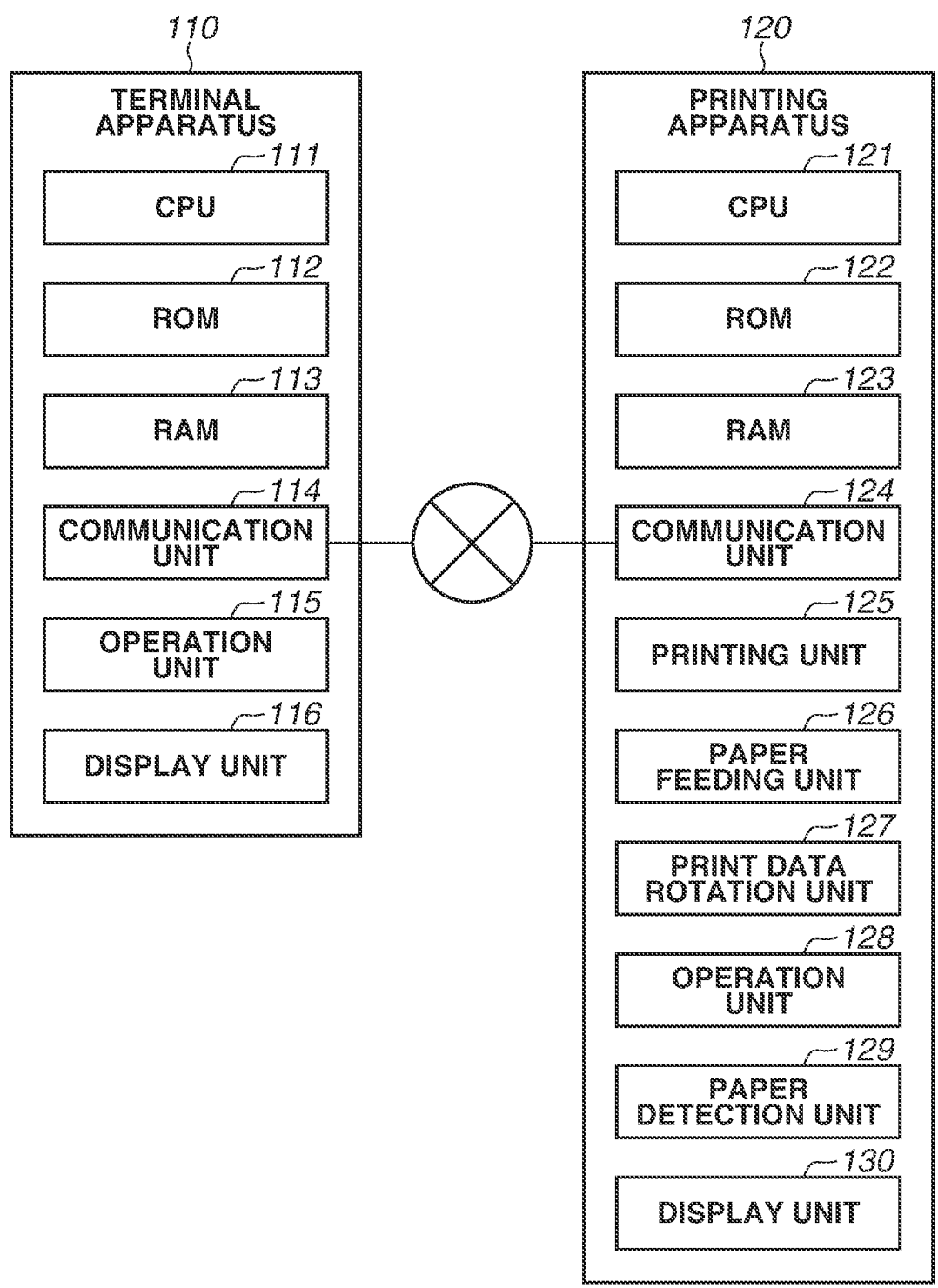
FIG. 1 is a system configuration diagram of a printing system according to an exemplary embodiment of the present disclosure.

FIG. 1 is a system configuration diagram of a printing system according to an exemplary embodiment of the present disclosure. The printing system according to the present exemplary embodiment includes a terminal apparatus 110, which generates a print job, and a printing apparatus 120, which consumes a print job. The terminal apparatus 110 is an electronic apparatus, such as a personal computer (PC), a smartphone, or a tablet, etc.

First, a configuration of the terminal apparatus 110 is described. A central processing unit (CPU) 111 controls the terminal apparatus 110 by loading a program stored in a read-only memory (ROM) 112 onto a random access memory (RAM) 113 and executes the program. For example, the CPU 111 is capable of generating a print job and transmitting the print job to the printing apparatus 120 via a communication unit 114. Setting information serving as a print setting to be included in a print job is input by the user via an operation unit 115 in a screen which is displayed on a display unit 116. Moreover, an image targeted for printing to be included in the print job is also selected by the user via the operation unit 115 in the screen which is displayed on the display unit 116. Furthermore, the display unit 116 is, for example, a liquid crystal panel and is able to display various types of display items and, possibly, an image. Moreover, in a case where the terminal apparatus 110 is a smartphone or a tablet, the display unit 116 can be a touch panel.

A print job generated by the CPU 111 is recorded on the RAM 113, and is then transmitted to the printing apparatus 120 via the communication unit 114. Furthermore, in the present exemplary embodiment, an interface (I/F) or connection configuration of the communication unit 114 is not particularly limited, for example, data can be transmitted and received via a wireless local area network (LAN), etc. Furthermore, processing operations which are performed by the terminal apparatus 110 illustrated in FIG. 2 and FIG. 5 described below are also implemented by the CPU 111.

Next, a configuration of the printing apparatus 120 is described. A CPU 121 controls the printing apparatus 120 by loading a program stored in a ROM 122 onto a RAM 123 and executing the program. For example, the CPU 121 receives a print job from the terminal apparatus 110 via a communication unit 124 and then executes the print job. Specifically, the CPU 121 analyzes the print job according to an analysis program stored in the ROM 122, thus acquiring setting information which is required to execute the print job. The CPU 121 determines a medium on which printing is to be performed according to the acquired setting information, and thus causes a paper feeding unit 126 to feed the medium. Moreover, as need arises, the CPU 121 causes a print data rotation unit 127, which performs rotation processing on print data, to perform rotation processing and, then, causes a printing unit 125 to perform print processing. Moreover, processing operations which are performed by the printing apparatus 120 illustrated in FIG. 2 and FIG. 5 described below and processing operations in the respective steps in a flowchart illustrated in FIG. 6 are also implemented by the CPU 121.

Furthermore, the print data rotation unit 127 can exist as a hardware circuit, and the CPU 121 can perform rotation processing on print data input to the hardware circuit. Alternatively, the print data rotation unit 127 can exist as a program module which is a part of the program stored in the ROM 122, and rotation processing can be performed by the program module being executed by the CPU 121.

Moreover, during printing, the CPU 121 causes a paper detection unit 129 to determine whether there is paper in the paper feeding unit 126. Then, in a case where there is no paper, the CPU 121 causes a display unit 130 to display that effect, thus being able to prompt the user to set paper into the paper feeding unit 126. After setting paper, the user is allowed to operate an operation unit 128 to issue an instruction for continuing printing. Moreover, the user is allowed to operate the operation unit 128 and the display unit 130 to previously register information about paper (for example, paper size and paper type) with the paper feeding unit 126, and the registered information about paper is recorded on the RAM 123. Furthermore, the RAM 123 is a non-volatile memory, and, even when the printing apparatus 120 has been powered off, the above-mentioned information about paper is retained. Moreover, the registration of information about paper is not limited to the case where it is performed with use of the operation unit 128 and the display unit 130, but can be set with use of a remote user interface (UI) which is provided from the printing apparatus 120 to the terminal apparatus 110. The setting performed with use of the remote UI is described below with reference to FIG. 2 and FIG. 3.

Figure 2:
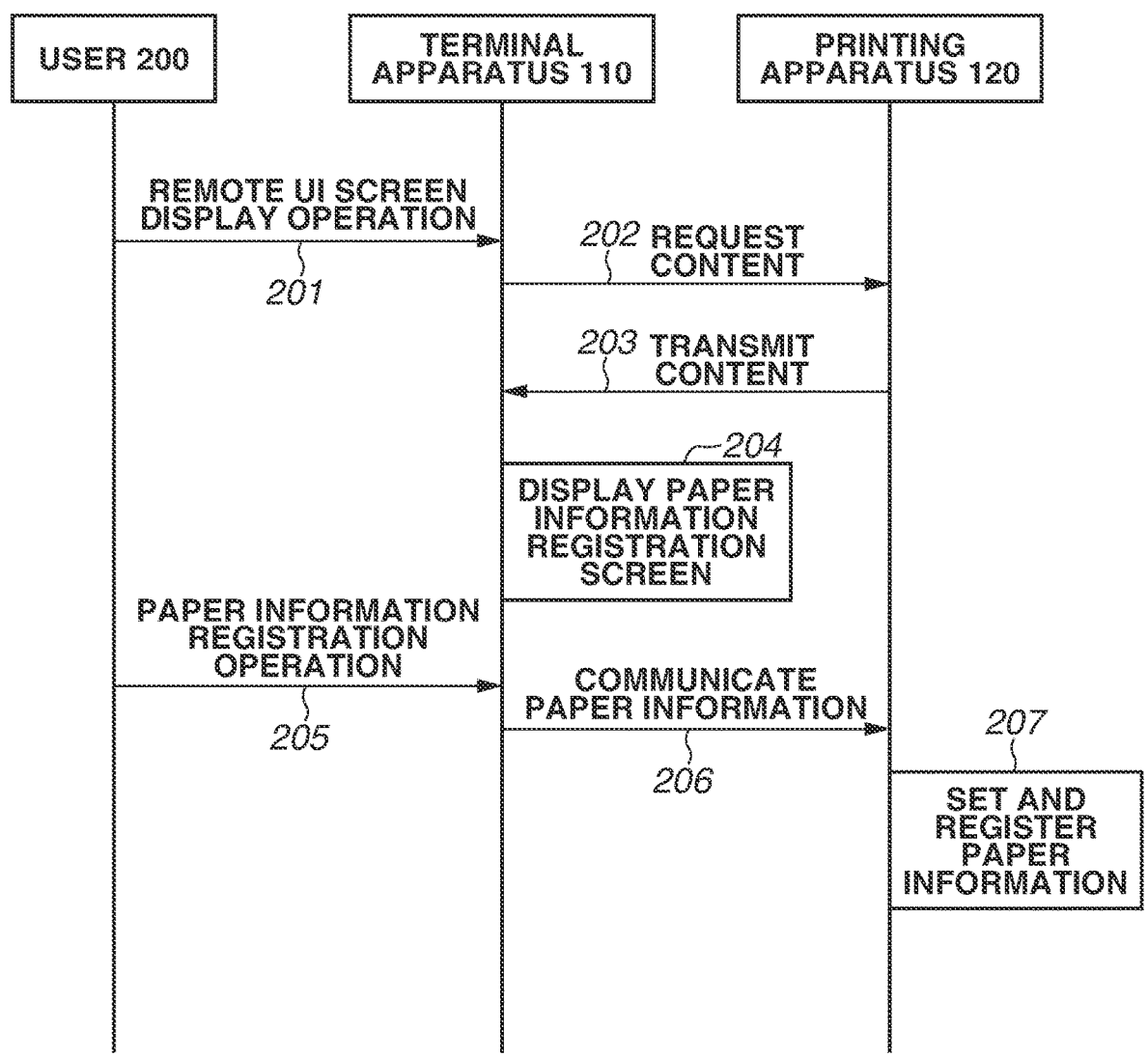
FIG. 2 is a sequence diagram illustrating processing for registering information about paper with use of a remote user interface (UI).

FIG. 2 is a sequence diagram illustrating processing for registering information about paper with use of a remote UI. Referring to FIG. 2, via the operation unit 115 of the terminal apparatus 110, the user registers information about paper set in the paper feeding unit 126 of the printing apparatus 120. Furthermore, in the remote UI, the printing apparatus 120 operates as a web server, and transmits web content, such as a HyperText Markup Language (HTML) file, in response to a request from the terminal apparatus 110 serving as a web client. This enables the printing apparatus 120 to cause the terminal apparatus 110 to display a predetermined operation screen (remote UI).

In step 201, the user 200 of the terminal apparatus 110 performs a remote UI screen display operation to cause the display unit 116 of the terminal apparatus 110 to display a screen for the remote UI. In the present exemplary embodiment, displaying of the remote UI screen is implemented by activating a browser application of the terminal apparatus 110 and inputting a Uniform Resource Locator (URL) corresponding to, for example, the Internet Protocol (IP) address of the printing apparatus 120.

In response to the operation performed in step 201, then in step 202, the terminal apparatus 110 requests content constituting a remote UI screen from the printing apparatus 120. In step 203, in response to the request made in step 202, the printing apparatus 120 transmits content stored in the ROM 122 or the RAM 123 to the terminal apparatus 110. The content which is transmitted in step 203 is, for example, an HTML file or image data specified by the HTML file.

In step 204, the terminal apparatus 110 displays the content transmitted from the printing apparatus 120 in step 203 with use of a web browser, thus displaying a paper information registration screen for the printing apparatus 120 serving as a remote UI. The paper information registration screen is described below with reference to FIG. 3. In step 205, while confirming the screen displayed in step 204, the user 200 performs an operation to register paper information about the printing apparatus 120. In step 206, the terminal apparatus 110 communicates the paper information registered in step 205 to the printing apparatus 120. In step 207, the printing apparatus 120 sets and registers the paper information communicated in step 206. As mentioned above, the paper information is stored in the RAM 123 of the printing apparatus 120.

According to the processing illustrated in FIG. 2, even with respect to a printing apparatus 120 which includes neither an operation unit nor a display unit, the user 200 is allowed to register paper information with the printing apparatus 120 with use of the operation unit 115 and the display unit 116 of the terminal apparatus 110.

Figure 3:
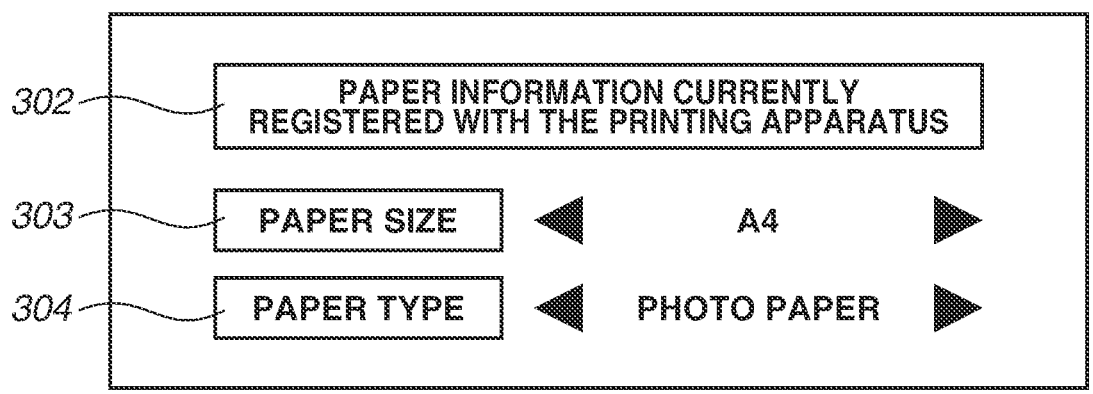
FIG. 3 is a diagram illustrating an example of a paper information registration screen.

FIG. 3 is a diagram illustrating an example of the paper information registration screen. In step 204 illustrated in FIG. 2, the paper information registration screen 301 is displayed on the display unit 116 of the terminal apparatus 110. The paper information registration screen 301 includes a screen title 302 indicating that paper information is registered. The user 200 selects, as paper information, a desired paper size and a desired paper type as the paper size 303 and the paper type 304, and registers the selected paper size and paper type. In the example illustrated in FIG. 3, the user 200 selects A4 as the paper size and photo paper as the paper type, information about which is then stored in the RAM 123 of the printing apparatus 120.

In the present exemplary embodiment, the terminal apparatus 110 provides a printing service included in an operating system (OS) as standard equipment, and the printing apparatus 120 also supports the printing service. In the printing service, communications are performed between the terminal apparatus 110 and the printing apparatus 120 according to a predetermined protocol, such as the Internet Printing Protocol (IPP) or the Web Services on Devices (WSD). Moreover, the terminal apparatus 110 transmits, without using a printer driver, a print job to the printing apparatus 120 according to the predetermined protocol. Additionally, in the printing service, before transmitting a print job, the terminal apparatus 110 acquires paper information from the printing apparatus 120, and displays the acquired paper information on the display unit 116. In the present exemplary embodiment, an example in which the paper information acquired from the printing apparatus 120 is displayed in a print setting screen by the terminal apparatus 110 is described.

Figure 4:
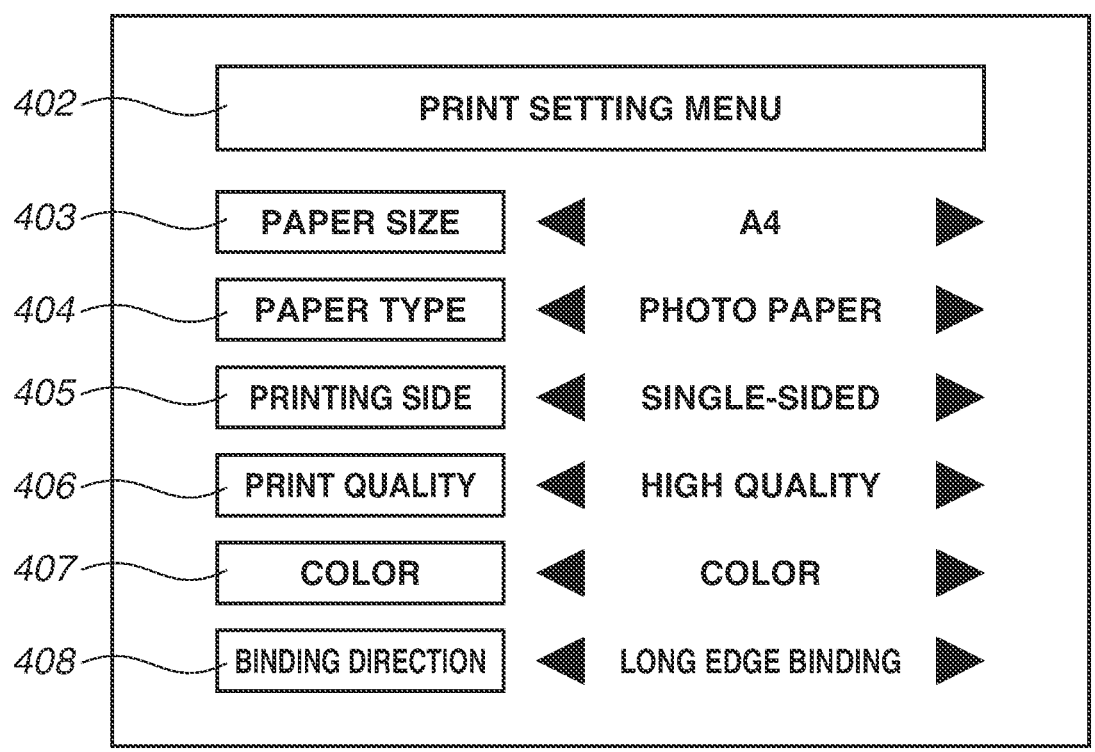
FIG. 4 is a diagram illustrating an example of a print setting screen which is displayed by a terminal apparatus according to the exemplary embodiment.

FIG. 4 is a diagram illustrating a display example of the print setting screen displayed by the terminal apparatus 110 in the present exemplary embodiment. The print setting screen 401 is displayed on the display unit 116 of the terminal apparatus 110. The print setting screen 401 includes a title 402 indicating that the displayed screen represents a print setting menu. The print setting screen 401 further includes, as settable items, paper size 403, paper type 404, printing side 405, print quality 406, color 407 and binding direction 408. With respect to each item, the user 200 is allowed to select predetermined settings with use of the operation unit 115. In the paper size 403, a paper size, such as "A4", "4×6", or "postcard size", can be selected. In the paper type 404, a paper type, such as "plain paper", "photo paper", or "postcard type", can be selected. In the printing side 405, a printing side, such as "single-sided" or "double-sided", can be selected. In the print quality 406, which indicates the degree of finish of printing, a print quality, such as "standard" or "high quality", can be selected. In the color 407, which indicates the color of printing, for example, "color" or "monochrome" can be selected. In the binding direction 408, which indicates a binding direction used for double-sided printing, for example, "long edge binding" or "short edge binding" can be selected.

Furthermore, when double-sided printing is selected with "long-edge binding" and the printed sheet of paper will be reversed around the long edge thereof, the top-and-bottom direction of the printing on the front side and the reverse side will be the same. On the other hand, when double-sided printing is selected with "short-edge binding" with the printed sheet of paper likewise being reversed around the long edge thereof, the top-and-bottom direction of the printing on the front side and the reverse side will be inverted. Thus, the top-and-bottom direction of the printing on the reverse side differs 180 degrees between "long edge binding" and "short edge binding" for double-sided printing in which the sheet is reversed along the long edge thereof. Therefore, data to be printed will be rotated 180 degrees in any one of "long edge binding" and "short edge binding" depending on the paper inversion mechanism included in the printing apparatus for double-sided printing. In other words, whether the rotation processing is performed for "long edge binding" and "short edge binding" is determined by first determining whether the inversion of the sheet of paper will result in the printing on the reverse side being started with the same leading edge as that of the front side or being started with the trailing edge thereof. In the present exemplary embodiment, in a case where "long edge binding" is designated, print data to be printed on the reverse side of the sheet of paper is assumed to be rotated 180 degrees by the terminal apparatus 110.

Moreover, the items selectable in the print setting screen 401 illustrated in FIG. 4 and the values selectable with respect to the respective items are not specifically defined in the present exemplary embodiment. For example, in a case where the printing apparatus 120 is not compatible with color printing, since the color 407 supports only "monochrome", the color 407 does not need to be displayed, or specifications in which only "monochrome" is selectable can be employed.

Additionally, a part or the whole of the setting items 403 to 408 illustrated in FIG. 4 can be not selected by the user but automatically set. In other words, the values of setting items are determined by the specifications of an application of the terminal apparatus 110 or the specifications of the printing apparatus 120. In this case, in the print setting screen illustrated in FIG. 4, letters indicating "automatic" can be displayed with respect to only the setting items which are automatically set. Moreover, if specifications in which options of all of the setting items 403 to 408 are only "automatic" are employed, such items do not need to be displayed. Besides, the content to be displayed in the print setting screen 401 and the layout thereof are not specifically limited. For example, the title 402 for the print setting menu can be omitted.

Furthermore, in the present exemplary embodiment, as described below with regard to step 504 illustrated in FIG. 5, paper information (paper size and paper type) which is currently registered with the printing apparatus 120 is communicated to the terminal apparatus 110. At this time, in the print setting screen 401 illustrated in FIG. 4, a paper size and a paper type indicated by the paper information are displayed as the paper size 403 and the paper type 404, respectively. At this time, the paper size 403 and the paper type 404 can be displayed in such a way as to be changeable to other values by the operation performed by the user, or can be fixed to the values indicated by the paper information. In the latter case, since the paper size 403 and the paper type 404 are automatically determined, the values indicated by the paper information can be displayed, or "automatic" can be displayed as the values of the paper size 403 and the paper type 404 as mentioned above.

Moreover, the print setting screen 401 can be omitted depending on the specifications of a printing application of the terminal apparatus 110. For example, if, in a photo application, the targets to be printed are supposed to be not documents but only photographs, since settings of the printing side 405 being "single-sided", the print quality 406 being "high quality", and the color 407 being "color" are frequently used, these values can be fixedly used. Moreover, since the printing side 405 is fixed to "single-sided", the binding direction 408 is omitted. Additionally, as mentioned above, the values of the paper size 403 and the paper type 404 can be fixed to the values indicated by the paper information acquired from the printing apparatus 120. In this case, the values to be set are automatically determined with respect to all of the items 403 to 408 illustrated in FIG. 4. Therefore, in the case of an application such as that mentioned above, the print setting screen 401 is not displayed, and a print job including the values automatically determined with respect to the respective setting items can be generated by the terminal apparatus 110 and then transmitted to the printing apparatus 120. This enables simplifying an operation which is performed by the user.

Figure 5:
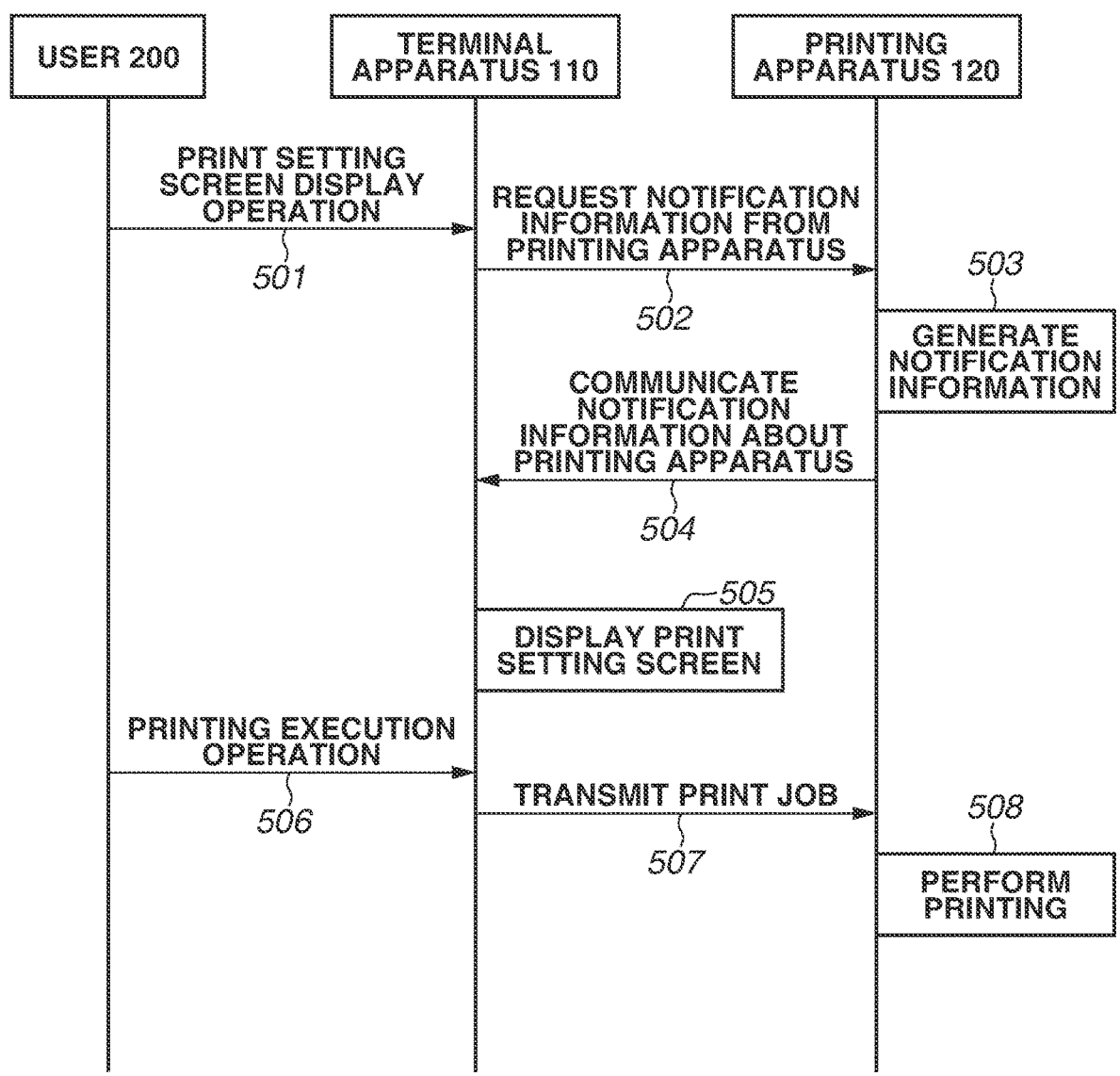
FIG. 5 is a diagram illustrating a printing sequence which is performed by the printing system according to the exemplary embodiment.
Figure 6:
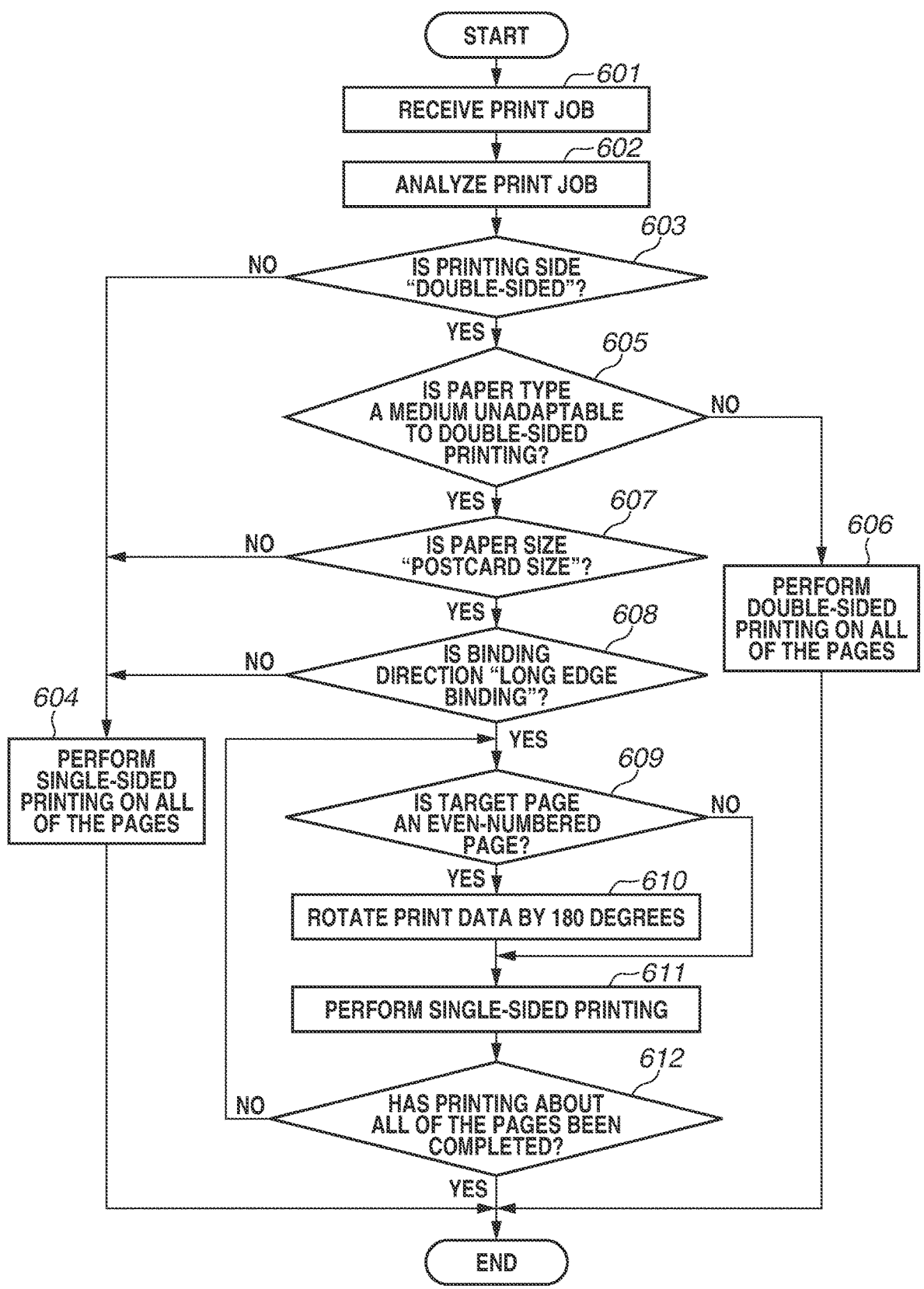
FIG. 6 is a flowchart illustrating print processing which is performed by a printing apparatus according to the exemplary embodiment.

FIG. 5 is a diagram illustrating a printing sequence which is performed by the printing system according to the present exemplary embodiment. As mentioned above, the printing system illustrated in FIG. 5 is a printing system included in an OS as standard equipment, in which printing is performed without the use of a printer driver.

In step 501, the user 200 performs an operation to cause the terminal apparatus 110 to display a print setting screen. In step 502, the terminal apparatus 110 request notification information about the printing apparatus 120 from the printing apparatus 120. Upon receiving the request for notification information in step 502, then in step 503, the printing apparatus 120 generates notification information. The notification information in step 503 includes information about the paper size and the paper type registered in step 207 illustrated in FIG. 2 and values of the paper size, paper type, printing side, print quality, color, and binding direction supported by the printing apparatus 120. In step 504, the printing apparatus 120 communicates the notification information generated in step 503 to the terminal apparatus 110.

In step 505, the terminal apparatus 110 displays a print setting screen illustrated in FIG. 4 with use of the notification information communicated in step 504. In the sequence illustrated in FIG. 5, the values supported by the printing apparatus 120 with respect to the respective setting items, which are included in the notification information, are displayed as selectable candidates. Moreover, the values of the paper information (paper size and paper type) registered in step 207, which is included in the notification information, are displayed as initial values of the paper size 403 and the paper type 404 illustrated in FIG. 4.

In step 506, the user 200 performs a printing execution operation in the print setting screen displayed in step 505. Specifically, a printing execution button (not illustrated) is included in the print setting screen, and the user 200 operates the printing execution button (for example, touches the printing execution button on a touch panel). In response to an instruction for printing issued by the user 200 in step 506, then in step 507, the terminal apparatus 110 generates a print job and then transmits the print job to the printing apparatus 120. Specifically, a print job including an image targeted for printing selected by the user 200 and the print settings selected in the screen illustrated in FIG. 4 is generated, and the generated print job is then transmitted to the printing apparatus 120 via the communication unit 114. Furthermore, the selection of an image targeted for printing by the user 200 is performed in an image selection screen (not illustrated) which is displayed on the display unit 116. The selection of an image can be performed before the operation for displaying the print setting screen in step 501, or can be performed after displaying of the print setting screen in step 505 and before the printing instruction in step 506.

In step 508, the printing apparatus 120 receives the print job from the terminal apparatus 110 via the communication unit 124, and then performs printing according to the content of the print job. Details of printing performed in step 508 are described below with reference to FIG. 6. Furthermore, the terminal apparatus 110 which registers paper information in the remote UI illustrated in FIG. 2 and the terminal apparatus 110 which generates a print job in the printing sequence illustrated in FIG. 5 can be different terminal apparatuses.

Furthermore, while, in the present exemplary embodiment, generation of the notification information in step 503 includes generation of information required for displaying of the screen illustrated in FIG. 4, the present exemplary embodiment is not limited to this. For example, information about the remaining amount of ink in an ink tank (not illustrated) of the printing apparatus 120 can be communicated, or an error state of the printing apparatus 120 can be communicated.

Moreover, in the present exemplary embodiment, timing of communication of the notification information from the printing apparatus 120 is not limited to step 504 in FIG. 5. For example, when the terminal apparatus 110 and the printing apparatus 120 have been first connected to each other via the communication unit 114 of the terminal apparatus 110 and the communication unit 124 of the printing apparatus 120, information about the printing apparatus 120 can be communicated to the terminal apparatus 110.

Furthermore, there are sheets of paper adapted for printing a photograph on a communication side thereof, which is the reverse side of the address side, such as "inkjet postcards" and "gloss photo postcards". In these postcards, while the material of the surface of the address side is paper, the communication side is further provided with an ink receptive layer, so that the image quality of a photograph printed on the communication side is improved. Accordingly, image processing is required to differ between the address side and the communication side. Thus, with regard to postcards on the communication side of which a photograph is printed, setting of double-sided printing for printing on postcards, which is performed via a printer driver, may be restricted in such a manner that printing is individually performed on the address side and the communication side not by automatic double-sided printing but by single-sided printing.

However, as mentioned above, in step 507 illustrated in FIG. 5, the terminal apparatus 110 in the present exemplary embodiment generates a print job without using a printer driver according to the printing system included in an OS as standard equipment, and then transmits the print job. Therefore, a print job in which the setting value of the paper size 403 in the print settings is "postcard" and the setting value of the printing side 405 is "double-sided" may be transmitted from the terminal apparatus 110 to the printing apparatus 120. Therefore, in a case where, in the print settings of the received print job, the setting value of the paper size is "postcard" and the setting value of the printing side is "double-sided", the printing apparatus 120 in the present exemplary embodiment automatically performs single-sided printing. In other words, the printing apparatus 120 in the present exemplary embodiment excludes "postcard" from targets for double-sided printing, thus preventing unintended double-sided printing from being performed on "postcard".

Moreover, the printing apparatus 120 is equipped with an automatic double-sided unit. After performing printing on the first surface of a print sheet, the automatic double-sided unit reverses the direction of travel of the print sheet and then conveys the print sheet, and re-supplies the print sheet to the printing unit with the second surface of the print sheet oriented in such a manner that the top-and-bottom direction is inverted. Therefore, to implement long edge binding in double-sided printing, it is necessary to rotate print data for an even-numbered page 180 degrees during generation of print data. Therefore, in the printing system included in an OS as standard equipment in the present exemplary embodiment, in a case where the setting value of the printing side 405 in the print settings is "double-sided" and the setting value of the binding direction 408 is "long edge binding", print data (an image targeted for printing) for an even-numbered page is rotated 180 degrees by the terminal apparatus 110. This enables the printing apparatus 120 to implement double-sided printing for long edge binding without the need to rotate print data for an even-numbered page 180 degrees.

However, in a case where, in the print settings, the setting value of the paper size is "postcard", the setting value of the printing side is "double-sided", and the setting value of the binding direction is "long edge binding", printing unintended by the user may sometimes be performed. For example, in a case where printing is performed for a plurality of pages each including, for example, the address, name, and postal code of the destination for printing on the address side of a postcard, since "double-sided" and "long edge binding" are set in the print settings, rotation by 180 degrees of an even-numbered page is performed by the terminal apparatus 110. On the other hand, in the printing apparatus 120, since double-sided printing is set with respect to the paper type "postcard", which is unadaptable to double-sided printing, the printing apparatus 120 automatically changes double-sided printing to single-sided printing and then performs printing. Therefore, an even-numbered page is rotated 180 degrees and is then used for printing. Therefore, a printed result unintended by the user may occur.

Furthermore, the paper type which is unadaptable to double-sided printing is not limited to postcard. However, particularly in the address side of a postcard, a frame for postal code or the like is previously printed, so that a print direction in which the user is to perform printing is previously determined. Therefore, if an even-numbered page is rotated 180 degrees and is then used for printing, the postcard medium itself may be wasted.

FIG. 6 is a flowchart illustrating print processing which is performed by the printing apparatus 120 according to the present exemplary embodiment. Furthermore, the flowchart of FIG. 6 illustrates details of processing for performing printing in step 508 illustrated in FIG. 5.

When the terminal apparatus 110 transmits a print job in step 507 illustrated in FIG. 5, then in step 601, the printing apparatus 120 receives the print job. In step 602, the printing apparatus 120 analyzes the print job, thus acquiring a print setting of the print job. In the present exemplary embodiment, a print job includes a print setting and print data for one or more pages. Moreover, the print settings includes, for example, paper size, paper type, printing side, print quality, color, and binding direction, which are settable by the terminal apparatus 110 in the print settings screen illustrated in FIG. 4.

In step 603, the printing apparatus 120 determines whether the value of the printing side in the print settings acquired in step 602 is "double-sided". If it is determined that the printing side in the print settings is "single-sided" (NO in step 603), then in step 604, the printing apparatus 120 performs single-sided printing about all of the pages included in the print job, and then completes the processing illustrated in FIG. 6. If the print data is a print job for only one page, the printing apparatus 120 performs single-sided printing about one page, and then completes the processing illustrated in FIG. 6. Furthermore, in step 604, an image having a size corresponding to the paper size in the print settings acquired in step 602 is generated based on the print job, and image processing corresponding to the paper type in the print settings is performed. Then, an image subjected to the image processing is printed on a print sheet.

On the other hand, if, in step 603, it is determined that the printing side in the print settings is "double-sided" (YES in step 603), the processing proceeds to step 605. In step 605, the printing apparatus 120 determines whether the paper type designated in the print settings is a medium unadaptable to double-sided printing. With respect to each of a plurality of paper types which the printing apparatus 120 supports, information indicating whether it is adaptable to double-sided printing is previously stored in the ROM 122. Then, in step 605, the printing apparatus 120 refers to such information and determines whether the paper type in the print settings is unadaptable to double-sided printing. For example, with respect to "plain paper", information indicating that double-sided printing is available is stored in the ROM 122, and, with respect to "photo paper" or "postcard type", information indicating that it is unadaptable to double-sided printing is stored in the ROM 122. If, in step 605, it is determined that the paper type in the print settings is a medium adaptable to double-sided printing (NO in step 605), the processing proceeds to step 606. In step 606, the printing apparatus 120 performs double-sided printing about all of the pages included in the print job, and then completes the processing illustrated in FIG. 6. If the print data is a print job for only one page, the printing apparatus 120 performs single-sided printing about one page, and then completes the processing illustrated in FIG. 6.

On the other hand, if, in step 605, it is determined that the paper type in the print settings is a medium unadaptable to double-sided printing (YES in step 605), the processing proceeds to step 607. In step 607, the printing apparatus 120 determines whether the paper size in the print settings is "postcard size". If it is determined that the paper size in the print settings is "postcard size" (YES in step 607), the processing proceeds to step 608, and, if it is determined that the paper size in the print settings is not "postcard size" (NO in step 607), the processing proceeds to step 604.

Next, in step 608, the printing apparatus 120 determines whether the binding direction in the print settings is "long edge binding". In the printing apparatus 120 according to the present exemplary embodiment, in a case where the printing side in the print settings is "double-sided" and the binding direction is "long edge binding", with respect to print data for an even-numbered page which is to be printed on the reverse side, the print data is previously rotated by the terminal apparatus 110. If, in step 608, it is determined that the binding direction in the print settings is "long edge binding" (YES in step 608), the processing proceeds to step 609, and, if it is determined that the binding direction in the print settings is "short edge binding" (NO in step 608), the processing proceeds to step 604.

In step 609, the printing apparatus 120 sequentially performs determinations with regard to images targeted for printing of a plurality of pages included in the print job received in step 601. Specifically, the printing apparatus 120 determines whether the page currently targeted for determination is an even-numbered page in the plurality of pages. If it is determined that the page currently targeted for determination is an even-numbered page (YES in step 609), the processing proceeds to step 610, and if it is determined that the page currently targeted for determination is an odd-numbered page (NO in step 609), the processing proceeds to step 611.

In step 610, the printing apparatus 120 causes the print data rotation unit 127 to rotate an image targeted for printing, which is print data for an even-numbered page, 180 degrees. As mentioned above, in the terminal apparatus 110, in a case where double-sided printing and long edge binding are set in the print settings, rotation by 180 degrees for double-sided printing is previously performed with respect to print data for an even-numbered page. Then, the print data rotated 180 degrees is transmitted from the terminal apparatus 110 to the printing apparatus 120. Therefore, in step 610, for the purpose of single-sided printing, print data for an even-numbered page is rotated 180 degrees, thus being returned to its original orientation.

In step 611, the printing apparatus 120 performs single-sided printing based on print data for the page currently targeted for determination in step 609 among pieces of print data for a plurality of pages included in the print job. Next, in step 612, the printing apparatus 120 determines whether single-sided printing has been performed in step 611 with respect to all of the pages included in the print job. If it is determined that single-sided printing about all of the pages has not yet been completed (NO in step 612), the processing returns to step 609, and, if it is determined that single-sided printing about all of the pages has been completed (YES in step 612), the processing illustrated in FIG. 6 ends. Furthermore, in a case where the processing returns to step 609, the target for determination in step 609 shifts to a next page.

With the processing performed in step 609 to step 612, among pieces of print data for a plurality of pages included in the print job, with respect to each odd-numbered page, single-sided printing is performed with print data that is not subjected to rotation processing. Then, with respect to each even-numbered page, single-sided printing is performed with print data which has been rotated 180 degrees in step 610.

Here, the processing in step 610 is described in detail. In the case of an even-numbered page, to rotate print data 180 degrees, the printing apparatus 120 is required to once store print data for at least one page in the RAM 123. Therefore, when receiving a print job in step 601, the printing apparatus 120 stores information about the print settings and print data for one page, or information about the print settings and print data for all of the pages, in the RAM 123. Furthermore, whether to store print data for one page or store print data for all of the pages can be determined, for example, by the CPU 121 according to the free space of the RAM 123. In a case where print data for one page is stored in the RAM 123, the printing apparatus 120 receives print data for a subsequent page as soon as printing for the current page is completed and a free space occurs in the RAM 123. For example, every time printing for one page is completed, the printing apparatus 120 requests print data for a next page from the terminal apparatus 110. Then, every time print data for one page is received, storing of print data in the RAM 123 and processing in step 609 to step 612 are performed. Specifically, in step 610, with respect to print data for one page stored in the RAM 123, rotation by 180 degrees is performed with use of the print data rotation unit 127.

Furthermore, while, in step 607, the printing apparatus 120 determines whether the paper size in the print settings is "postcard size", the printing apparatus 120 can determine whether not the paper size but the paper type is "postcard type", such as "inkjet postcard" or "gloss photo postcard".

As described above, in a case where "double-sided" and "long edge binding" are set in a print setting, rotation by 180 degrees for an even-numbered page is performed by the terminal apparatus 110, and double-sided printing is automatically changed to single-sided printing by the printing apparatus 120 during printing. According to the processing illustrated in FIG. 6, in step 610, print data for an even-numbered page is rotated 180 degrees by the printing apparatus 120. Therefore, the orientation of print data for an even-numbered page returns to an orientation thereof obtained before the print data is rotated for double-sided printing in the terminal apparatus 110. Accordingly, in single-sided printing to be performed in step 611, it becomes possible to prevent printing from being performed with an orientation conforming to double-sided printing. Therefore, particularly, with respect to a medium in which the print direction is significant, such as a postcard medium, single-sided printing for print data with an appropriate orientation becomes possible, so that it is possible to reduce a medium from being wasted due to failure of printing.

Furthermore, while, in step 607, the printing apparatus 120 determines whether the paper size in the print settings is "postcard size", this determination can be skipped. Even in the case of other than the postcard size, the print direction may differ between an odd-numbered page and an even-numbered page and the user may be required to perform work for making orientations of pages uniform after printing, so that the user convenience may decrease. Therefore, the above-described processing can be applied to all of the double-sided printing settings with long edge binding.

Moreover, in the above-described exemplary embodiment, in a case where the binding direction is long edge binding, an even-numbered page is rotated 180 degrees by the terminal apparatus 110. However, depending on a paper inversion mechanism included in the printing apparatus 120, in a case where the binding direction is short edge binding, an even-numbered page can be rotated 180 degrees by the terminal apparatus 110. In this case, if, in step 608, it is determined that the binding direction is long edge binding, the processing proceeds to step 604, and, if it is determined that the binding direction is short edge binding, the processing proceeds to step 609.

Additionally, in the above-described exemplary embodiment, the description has been made while a postcard widely used in Japan, in which a field into which to write a postal code is provided, as a medium unadaptable to automatic double-sided printing is taken as an example. However, the exemplary embodiment is not limited to this, but, in a case where printing is performed on a postcard used in, for example, the United States, processing similar to the processing performed in a case where printing is performed on the post card described in the above exemplary embodiment can be performed. Postcards include a postcard in which a stamp field or an address field is previously printed. Therefore, in a case where, for example, an address is printed while being rotated 180 degrees from the original orientation, the address may in some cases not be appropriately printed in the address field on the postcard, or the address may be printed in the stamp field. In such a case, the postcard may be wasted. According to the above-described exemplary embodiment, single-sided printing is performed while an image is rotated by the printing apparatus in such a manner that the orientation of the image returns to an orientation thereof obtained before the image is rotated for double-sided printing by the terminal apparatus. Accordingly, printing can be performed on a postcard with an appropriate orientation thereof.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-068249 filed Mar. 30, 2018, which is hereby incorporated by reference herein in its entirety.

What is claimed is:

1. A printing apparatus that performs printing of images, corresponding to a plurality of pages, based on data received from a terminal apparatus, the printing apparatus comprising:
   at least one processor;
   a printing mechanism which prints an image,
   wherein the at least one processor, acquires print settings for printing of the images;
   performs second rotation processing on an image among the images based on that the image corresponds to an even-numbered page among the plurality of pages, in a case where double-sided printing and a predetermined binding direction are set as print settings for printing on a predetermined type of medium, in the print settings acquired by the acquisition; and
   causes the printing mechanism to perform single-sided printing using the image on which the second rotation processing has been performed,
   wherein the terminal apparatus performs first rotation processing on the image based on that the image corresponds to the even-numbered page, in a case where double-sided printing and the predetermined binding direction are set as print settings for printing on the predetermined type of medium, and the terminal apparatus transmits the image on which the first rotation processing has been performed to the printing apparatus, and
   wherein the at least one processor performs the second rotation processing on the image of the even-numbered page, such that an orientation of the image of the even-numbered page returns to an orientation before the first rotation processing.

2. The printing apparatus according to claim 1, wherein the printing mechanism performs single-sided printing of an image of an odd-numbered page among the images and the image of the even-numbered page on which the second rotation processing has been performed.

3. The printing apparatus according to claim 1, wherein, in a case where, as a print setting for printing on a first type of medium serving as the predetermined type of medium, double-sided printing is set based on the print settings acquired by the acquisition, the printing mechanism performs single-sided printing of the image of the even-numbered page.

4. The printing apparatus according to claim 3, wherein, in a case where, as a print setting for printing on a second type of medium not serving as the predetermined type of medium, double-sided printing is set based on the print setting acquired by the acquisition, the second rotation processing is not performed on the image of the even-numbered page and the printing mechanism performs single-sided printing of the image of the even-numbered page.

5. The printing apparatus according to claim 4, wherein the second type is photo paper.

6. The printing apparatus according to claim 1, wherein the predetermined type is postcard type.

7. The printing apparatus according to claim 1, wherein the predetermined binding direction is long edge binding.

8. The printing apparatus according to claim 1, the at least one processor determines whether printing of an image targeted for printing is printing on the predetermined type of medium, based on paper size in the print settings acquired by the acquisition.

9. A control method for a printing apparatus that performs printing of images, corresponding to a plurality of pages, based on data received from a terminal apparatus, the control method comprising:
   acquiring print settings for printing of the images;
   performing second rotation processing on an image among the images based on that the image corresponds to an even-numbered page among the plurality of pages, in a case where double-sided printing and a predetermined binding direction are set as print settings for printing on a predetermined type of medium, in the acquired print settings; and
   performing single-sided printing using the image on which the second rotation processing has been performed,
   wherein the terminal apparatus performs first rotation processing on the image based on that the image corresponds to the even-numbered page, in a case where double-sided printing and the predetermined binding direction are set as print settings for printing on the predetermined type of medium, and the terminal apparatus transmits the image on which the first rotation processing has been performed to the printing apparatus, and
   wherein the control method further comprises performing the second rotation processing on the image of the even-numbered page, in such a manner that an orientation of the image of the even-numbered page returns to an orientation before the first rotation processing.

10. The control method according to claim 9,
    wherein the control method further comprises:
    performing single-sided printing of an image of an odd-numbered page among the images and the image of the even-numbered page on which the second rotation processing has been performed.

11. The control method according to claim 9, further comprising, in a case where, as a print setting for printing on a first type of medium serving as the predetermined type of medium, double-sided printing is set based on the acquired print settings, performing single-sided printing of the image of the even-numbered page.

12. The printing apparatus according to claim 11, further comprising, in a case where, as a print setting for printing on a second type of medium not serving as the predetermined type of medium, double-sided printing is set based on the acquired print settings, performing single-sided printing of the image of the even-numbered page without performing the second rotation processing on the image of the even-numbered page.

13. The control method according to claim 12, wherein the second type is photo paper.

14. The control method according to claim 9, wherein the predetermined type is postcard type.

15. The control method according to claim 9, wherein the predetermined binding direction is long edge binding.

16. The control method according to claim 9, further comprising determining whether printing of an image targeted for printing is printing on the predetermined type of medium, based on paper size in the acquired print settings.

17. A printing system comprising a terminal apparatus, and a printing apparatus that performs printing of images, corresponding to a plurality of pages, based on data received from the terminal apparatus,
wherein the terminal apparatus includes:
at least one first processor;
wherein the at least one first processor,
performs a print setting about the image;
performs first rotation processing on an image among the images based on that the image corresponds to an even-numbered page among the plurality of pages, in a case where double-sided printing and a predetermined binding direction is set by the setting as print settings for printing on a predetermined type of medium; and
transmits, to the printing apparatus, data of the images including the on which the first rotation processing has been performed, and the print settings set by the setting, and
wherein the printing apparatus includes:
at least one second processor that performs second rotation processing on the image among the images of the data transmitted by the transmission based on that the image corresponds to the even-numbered page among the plurality of pages, in a case where double-sided printing and the predetermined binding direction are set as print settings for printing on the predetermined type of medium in the print settings transmitted by the transmission; and
a printing mechanism performs single-sided printing of the image rotated by the second rotation,
wherein the at least one second processor performs the second rotation processing on the image of the even-numbered page such that an orientation of the image of the even numbered page returns to an orientation before the first rotation processing.

18. The printing system according to claim 17, wherein the at least one second processor:
registers paper information about media; and
communicates the paper information registered by the registration to the terminal apparatus, and
wherein the at least one processor included in the terminal apparatus performs a print setting based on the paper information.

19. The printing system according to claim 17, wherein the terminal apparatus transmits a print job to the printing apparatus according to Internet Printing Protocol (IPP).

* * * * *